United States Patent [19]

Wilkins

[11] Patent Number: 4,667,995
[45] Date of Patent: May 26, 1987

[54] BUMPER GUARD FOR MOUNTING HEADLAMPS

[75] Inventor: Firle J. Wilkins, La Verne, Calif.

[73] Assignee: Per-Lux Inc., Covina, Calif.

[21] Appl. No.: 830,609

[22] Filed: Feb. 19, 1986

[51] Int. Cl.⁴ .............................................. B60R 19/02
[52] U.S. Cl. .................................... 293/117; 293/143; 362/82
[58] Field of Search ................... 293/117, 143; 362/82

[56] References Cited

U.S. PATENT DOCUMENTS

| | | | |
|---|---|---|---|
| 2,177,968 | 10/1939 | Weiss | 362/82 |
| 2,555,795 | 6/1951 | Koch | 293/143 |
| 2,613,099 | 10/1952 | Arbib | 293/117 |
| 2,722,447 | 11/1955 | Nickles | 293/117 |
| 3,563,595 | 2/1971 | Slavney | 293/143 |

*Primary Examiner*—Robert R. Song
*Attorney, Agent, or Firm*—Nilsson, Robbins, Dalgarn, Berliner, Carson & Wurst

[57] ABSTRACT

A bumper guard-headlamp assembly including a body affixed to a vehicle bumper to which a headlamp is secured having a first surface which extends horizontally further from the bumper than the headlamp.

12 Claims, 2 Drawing Figures

BUMPER GUARD FOR MOUNTING HEADLAMPS

BACKGROUND OF THE INVENTION

The present invention relates to vehicle bumper guards. Specifically, the present invention relates to a bumper guard and head lamp assembly which is mounted to a bumper.

It is sometimes desirable to provide motor vehicles with additional headlamps. This is particularly true for providing motor vehicles with specialized headlamps, such as quartz and fog headlamps. These additional headlamps are typically mounted directly to the roof or a rack mounted on the roof of the vehicle or underneath the bumper of some vehicles.

Substantial candle power is dissipated prior to illumination of the area forward of the vehicle with roof mounted lights. Furthermore, under foggy conditions, lamps mounted on the vehicle roof cannot be used because the light is so diffused by the fog particles that the operators vision is impaired.

Headlamps may only be mounted underneath vehicle bumpers which possess means of attachment. Otherwise, the headlamp may only be attached to the bumper at a substantial cost. There are major drawbacks with mounting a headlamp beneath a bumper. The distance which is illuminated by the headlamp is a function of its displacement from the ground. When a headlamp is attached beneath a bumper, it is positioned close to the ground. This significantly reduces the illumination distance. Furthermore, headlamps positioned beneath bumpers are vulnerable to damage from raised objects, e.g. curbs.

There thus remains a need to provide for the mounting of headlamps at a forward position of a vehicle to improve utilization of the available illumination in a convenient manner which provides some protection for the mounted headlamp.

SUMMARY OF THE INVENTION

The present invention is directed to an assembly for mounting a light to a vehicle bumper. The assembly includes a body affixed to the bumper and having a first surface horizontally displaced outward from the bumper with a headlamp affixed to the body and having the lens thereof horizontally displaced closer to the bumper than the body's first surface.

BRIEF DESCRIPTION OF THE DRAWINGS

The present invention may be better understood and its numerous advantages will be apparent to those ordinarily skilled in the art by reference to the accompanying drawings, wherein like reference numerals refer to like elements in the several figures in which.

DESCRIPTION OF THE PREFERRED EMBODIMENT

The invention is directed to an auxilary headlamp and bumper guard assembly detachably mounted to a vehicle bumper. The assembly includes a body to which the headlamp is affixed which body is secured to a bumper. The body is provided with a surface which extends horizontally outward from the bumper beyond the headlamp lens to provide a protective surface for the headlamp.

Figure 1:
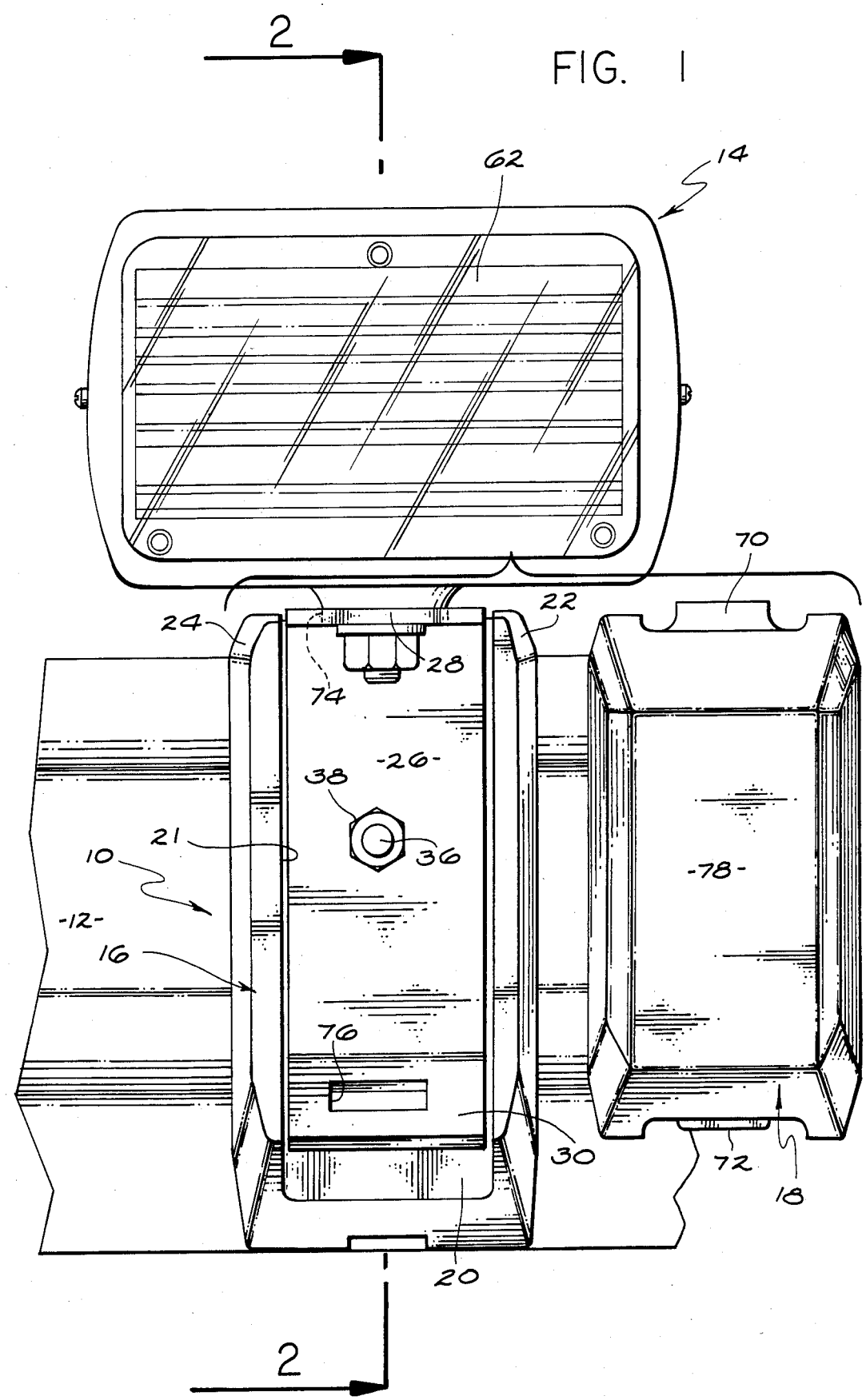
FIG. 1 is a partially exploded front view of a bumper guard and headlamp assembly in accordance with one embodiment of the invention.
Figure 2:
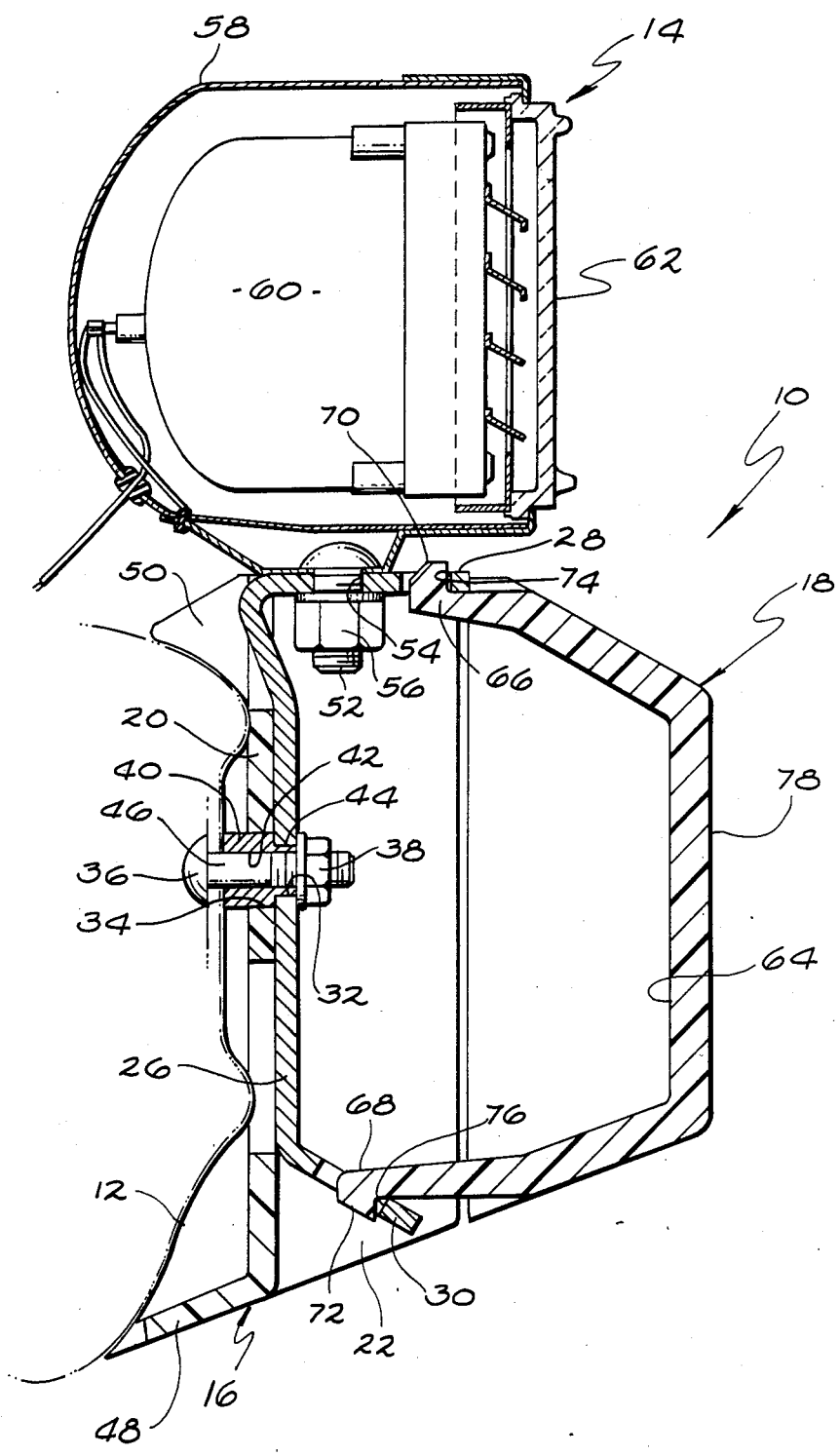
FIG. 2 is a cross-sectional view of a fully assembled assembly as shown in FIG. 1 along line 2—2.

Referring jointly to FIGS. 1 and 2, a bumper guard-headlamp assembly in accordance with the invention is seen generally at 10. Bumperguard-headlamp assembly 10 includes a body 8 affixed in an manner to a vehicle bumper 12 to which headlamp 14 is mounted. The body 8 of assembly 10 includes a rear section 16 of a front section 18. Rear section 16 consists of a rear wall 20 abutting bumper 12 and two opposing side walls 22 and 24 extending laterally outward from wall 20 (with only 22 shown in FIG. 2). The walls 20, 22 and 24 of rear section 16 define a channel 21 (as seen in FIG. 1) into which a bracket 26 is disposed. Bracket 26 has first and second ends 28 and 30 which are angularly disposed with respect to the remainder of bracket 26. Preferably, first end 28 is positioned approximately ninety degrees and a second end 30 is positioned to a lesser angle to the remainder of bracket 26. Bracket 26 and rear section 16 are affixed to bumper 12 by passing a bolt 36 through respectively provided openings 32, 34 and 46 of bracket 26, rear section 16 and bumper 12. A nut 38 is threadably secured down upon bolt 36. Preferably, an adaptor 40 is received within openings 32 and 34 to allow for the accommodation of different diameter bolts and spacings between the bumper and the bracket 26. Adaptor 40 has a passageway 42 for receiving the bolt 36.

Rear section 16 includes rearward extending projections 48 and 50 which extend about bumper 12. These projections 48 and 50 engage bumper 12 and inhibit the rotation of assembly 10 about bolt 36. Other means may be provided to inhibit the rotation of assembly 10 such as by fastening the assembly 10 to the bumper with a second bolt. In addition, the rear section may have different shapes to conform to the configuration of the bumper surface.

Headlamp 14 is fastened to the first end 28 of bracket 26. Typically, headlamp 14 possesses a bolt 52 which extends beneath headlamp 14. Headlamp 14 is then fastened to bracket 26 by passing bolt 52 through an opening 54 through first end 28 to which a nut 56 is threadably secured. Headlamp 14 may be any suitable type of useful vehicle head. Headlamp 14 includes a body 58, bulb 60 and front lens 62. Preferably, headlamp 14 is a fog or quartz type lamp of high intensity. Headlamp 14 may be mounted at any position to body 8, e.g. to the top, bottom or to the side. Preferably, headlamp 14 is mounted to the top of body 8. This minimizes the vulnerability of headlamp 14 to contact with objects rising above the road surface, e.g. curbs, and also a greater illumination distance can be provided by the light due to its raised position.

In order to reduce the potential of impact and damage to headlamp 14 and particularly lens 62, the front 18 of body 8 extends horizontally outward from the bumper 12 beyond lens 62. Front section 18 is generally rectangular and may either be solid or as illustrated include a generally rectangular recess 64. Front section 18, as well as the remainder of body 8, may be constructed of any suitable material, preferably a resilient type of material. Recess 64 is defined by a peripheral wall section 80 which is closed at one end by front wall 78 and open at its opposing end. Wall section 80 is comprised of two pairs of opposing inwardly angled wall sections. Front housing section 18 is detachably secured to rear housing section 16 by positioning tabs 70 and 72, which outwardly protrude from extensions 66 and 68 of the wall section 80, through openings 74 and 76 of the bracket 26 first and second ends 28 and 30, respectively. Either front housing section 18 or extensions 66 and 68 are inwardly compressible to allow tabs 70 and 72 to be positioned within or removed from openings 74 and 76. The compressibility of front housing section 18 or extensions 66 and 68 may be provided by formation from a resilient, impact resistant material such as polyurethane.

As seen from FIG. 2 when mounted upon rear section 16, front wall 78 of front section 18 is disposed horizontally further from bumper 12 than headlamp 14. The front wall 78 of front housing section 18, will absorb impact prior to headlamp 14 and particularly lens 62. Preferably, front housing section 18 is comprised of a resilient, impact resistant material, such as polyurethane to allow absorption of impact energy. This further protects lens 62 and headlamp 14.

While the preferred embodiment has been described and illustrated, various modifications and substitutions may be made thereto without departing from the scope of the invention. Accordingly, it is to be understood that the present invention has been described by way of illustration and not limitation.

What is claimed is:

1. An apparatus mounted to a vehicle bumper comprising:
    a body affixed to said bumper including first and second opposing surfaces connected by at least a first peripheral surface, with said second surface being placed in an abutting relationship with said bumper and said first surface being horizontally displaced outward from said bumper;
    a headlamp detachably affixed to said body peripheral surface and being horizontally displaced closer to said bumper than said body first surface, and
    mounting means associated with said body for detachably affixing said headlamp to said body peripheral surface.

2. The apparatus of claim 1 wherein said body has first and second sections, said first section including said second surface abutting said bumper and said second section including said first surface, said second section detachably mated to said first section.

3. The apparatus of claim 2 wherein said first section is defined by a generally planar wall from which two laterally opposing side walls extend, said planar wall including said second surface.

4. The apparatus of claim 3 wherein said body is affixed to said bumper with a bolt positioned through an opening in said planar wall.

5. The apparatus of claim 4 wherein said mounting means being disposed between said side walls and abutting said planar wall of said first section.

6. The apparatus of claim 5 wherein said headlamp is provided with a bolt, said bolt being passed through an opening in said mounting means to which a nut is secured.

7. The apparatus of claim 6 wherein said mounting means is a generally rectangular bracket having first and second opposing ends, said first end disposed horizontally above said second end and angularly positioned with respect to the remainder of said bracket and said first end including said opening for receiving said headlamp bolt.

8. The apparatus of claim 7 wherein said second section includes a wall defining said first surface about which a peripheral wall is connected, said peripheral wall provided with means for detachably mating with said first section.

9. The apparatus of claim 8 wherein said detachably mating means comprises first and second opposing tabs outwardly protruding from said peripheral wall which are receivable in first and second opposing openings being provided said bracket.

10. The apparatus of claim 11 wherein said planar wall of said first section has first and second opposing ends which extend about said bumper.

11. The apparatus of claim 10 wherein said body is comprised of an energy absorbing material.

12. A device useful for detachably securing a headlamp to and above a vehicle bumper comprising:
    a body having first and second surfaces disposed in opposing generally parallel planes connected by a peripheral wall having a planar surface disposed above said bumper, means for removably securing said headlamp to said planar surface, said first surface abutting said bumper, means for removably securing said first surface to said bumper, said second surface being disposed horizontally further from said bumper than said headlamp.

* * * * *

UNITED STATES PATENT AND TRADEMARK OFFICE
CERTIFICATE OF CORRECTION

PATENT NO. : 4,667,995

DATED : May 26, 1987

INVENTOR(S) : Firle J. Wilkins

It is certified that error appears in the above-identified patent and that said Letters Patent is hereby corrected as shown below:

IN THE CLAIMS:

Claim 10, column 4, line 30, delete "11" and substitute --9--.

Signed and Sealed this

Twenty-ninth Day of December, 1987

*Attest:*

DONALD J. QUIGG

*Attesting Officer*  *Commissioner of Patents and Trademarks*